Jan. 22, 1952        A. RAPPL        2,583,120

ACCESSORY SYSTEM FOR MOTOR VEHICLES

Filed Jan. 26, 1949        2 SHEETS—SHEET 1

INVENTOR
*Anton Rappl*
BY
*Bean, Brooks, Buckley & Bean.*
ATTORNEYS

Jan. 22, 1952  A. RAPPL  2,583,120
ACCESSORY SYSTEM FOR MOTOR VEHICLES
Filed Jan. 26, 1949  2 SHEETS—SHEET 2
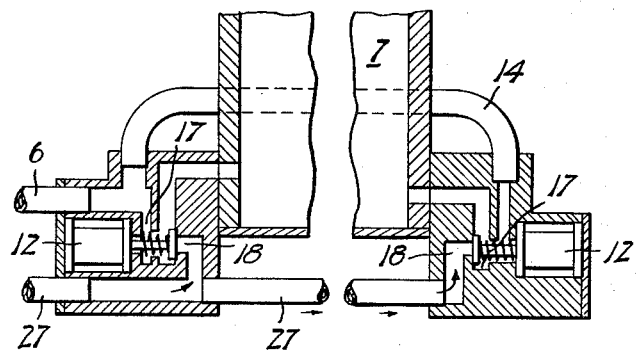
Fig. 2.
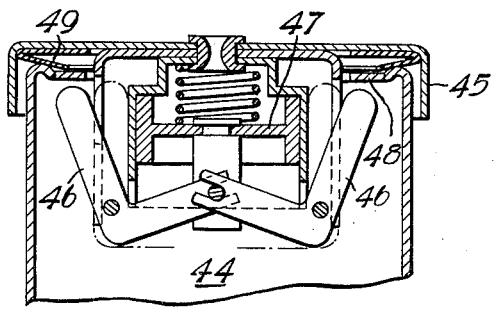
Fig. 3.
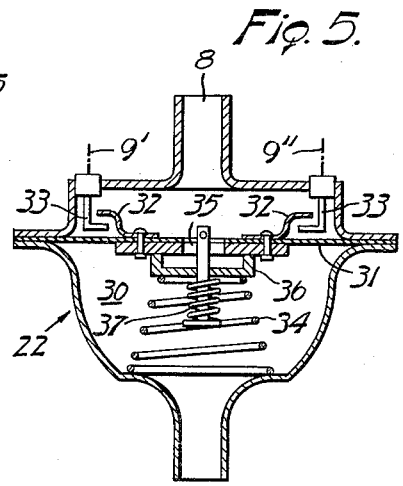
Fig. 5.
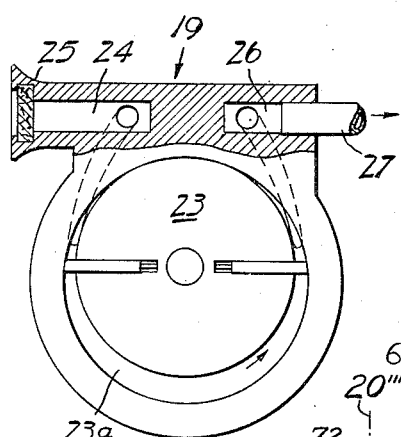
Fig. 4.
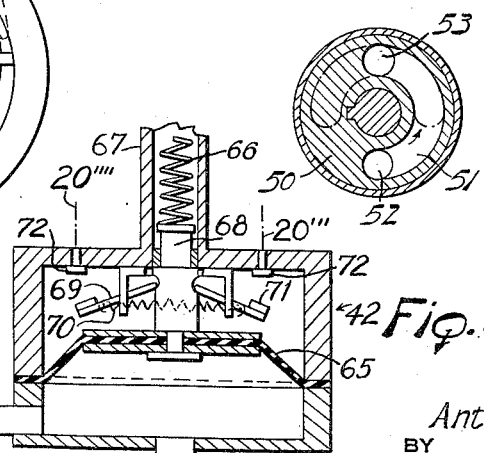
Fig. 6.
Fig. 7.
INVENTOR
Anton Rappl
BY
Bean Brooks Buckley & Bean
ATTORNEYS Patented Jan. 22, 1952

2,583,120

UNITED STATES PATENT OFFICE 2,583,120

ACCESSORY SYSTEM FOR MOTOR VEHICLES

Anton Rappl, Eggertsville, N. Y., assignor to Trico Products Corporation, Buffalo, N. Y.

Application January 26, 1949, Serial No. 72,965

16 Claims. (Cl. 60—14)

This invention relates to an accessory system for motor vehicles and has particular reference to a fluid pressure system for feeding fuel to the vehicle power plant as well as to one for supplying the required operating pressure for the actuation of fluid accessories.

Heretofore it has been proposed to utilize different sources of fluid pressure for the operation of accessory systems, but for various reasons they have not received the approval of the automotive industry.

The present invention has for its object to provide a fluid pressure system which is practical and efficient, and further one in which ample operating pressure differential is provided at all times.

Again the invention has for its object to provide a multi-accessory arrangement by which pressure differentials of varying degree are satisfactorily provided for the efficient performance of plural accessory systems.

Furthermore, an important object of the invention is to provide a fuel feeding system which is safe in that the motivating pressure is removed whenever the engine ignition system is rendered inoperative.

The foregoing and other objects will manifest themselves as the following description progresses wherein reference is made to the accompanying drawings, in which Fig. 1 is a diagrammatic view showing the layout of an accessory system embodying the present invention;

Fig. 2 is a fragmentary sectional view of the window operator accessory;

Fig. 3 is an enlarged sectional view through the fuel tank cap;

Fig. 4 is a sectional view through the air pump;

Fig. 5 is an enlarged sectional view through the flow control switch;

Fig. 6 is a detailed sectional view through the combined ignition switch and venting valve; and Fig. 7 is a sectional view through the fuel switch.

Figure 1:
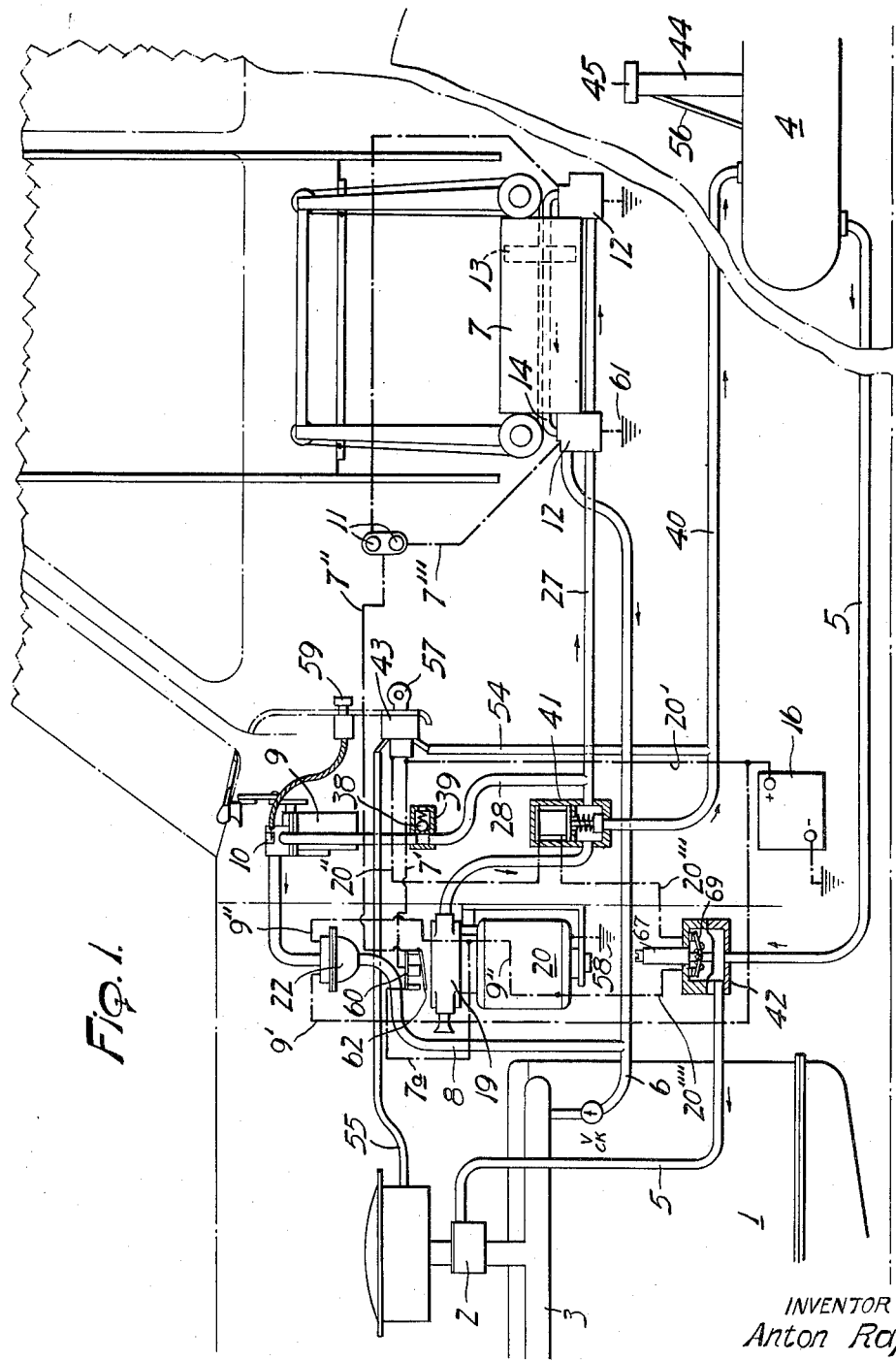

Referring more particularly to the drawings, the numeral 1 designates the vehicle engine, 2 its carburetor, 3 its intake manifold, and 4 its gasoline supply tank which is connected by a conduit 5 leading up to the carburetor. The intake manifold constitutes a source of negative pressure and is connected by a conduit 6 to one accessory, such as a window regulator 7 and by a branch conduit 8 to a second accessory, such as a windshield cleaner 9. The cleaner is operated from a control valve 10, while the window regulator is actuated from "open" and "close" switches 11 in circuit with solenoidal valves 12 that normally maintain the piston 13 suction balanced through a pressure equalizing passage 14. Upon closing either switch 11 the associated valve solenoid will become energized by the source of electrical power 16 and move the valve from one port closing position to the other for closing off the normally open suction port 17 and opening the normally closed atmospheric or higher pressure port 18.

For pressure actuation of either accessory, as well as for maintaining a fuel feeding pressure in the fuel tank 4, there is provided an air pump 19 which is suitably driven as by an electric motor 20 connected in circuit with the battery 16. This pump functions whenever the manifold influence is either inadequate or wholly lacking, and in order to bring it in automatically a flow actuated switch 22 is interposed in the suction line 6, 8, as well as in the motor circuit. When the manifold suction is ample the electric motor circuit will remain open but otherwise the circuit will be conditioned for closing upon the actuation of either accessory control 10 or 11.

The pump 19, illustrated more clearly in Fig. 4, by way of example, has a rotor 23 operating in a chamber 23a, the latter having an inlet 24, provided with an air filter 25, and an outlet 26 connected by a conduit 27 to the ports 18 of the window regulator and by a branch connection 28 to the windshield cleaner 9.

The suction response switch 22 as illustrated comprises a chamber 30 and a flexible or elastic diaphragm 31, the latter having contact means 32 adapted to bridge the gap between the two fixed contacts 33. A spring 34 urges the diaphragm to its normal circuit-opening position. The diaphragm is formed with an opening 35 which is normally closed by a valve 36 under the urge of the spring 34 as modified by a smaller spring 37. A pressure regulating valve 38 may be interposed in the pressure line to open at a given pressure, as determined by a spring 39, to limit the degree of positive pressure admitted to the accessory motor.

A second branch conduit 40 conducts positive pressure from the pump 19 to the fuel tank to maintain a fuel feeding pressure therein. This branch is normally closed by a solenoid valve 41 that is in series circuit with a liquid pressure responsive switch 42 in the fuel line 5 and the solenoid of valve 41 is adapted to be energized upon the closing of the fuel switch 42 when the pressure on the fuel drops below a predetermined degree. The fuel switch and the solenoid valve are connected in circuit with the electric motor and also the usual ignition switch 43 so that should the fuel in the carburetor be low when the ignition switch is closed the electric motor will start the pump to raise the fuel tank pressure through the now opened solenoid valve 41. When the tank pressure has been built up to the required degree, the fuel pressure switch 42 of the snap action type will again open the circuit and allow the valve 41 to close. This pressure switch may be of any approved form, the one shown in Fig. 7 comprising a diaphragm 65 on which the pressure fluid will act against a depressing spring 66, the latter being arranged within a housing 67 and acting downwardly upon a stem 68 to shift the switch levers 69 across a dead-center position, with respect to their pivotal mountings, to enable the snap-over spring 70 moving the lever contacts 71 against or away from the fixed contacts 72, depending upon their direction of movement. The stem 68 is fixed to the diaphragm 65 for moving the same in response to the pressure movements of the diaphragm.

In order to secure the fuel feeding pressure in the fuel tank against unauthorized depletion while the vehicle engine is running, the filling pipe 44 for the tank is closed airtight by a cap 45 having a pressure responsive lock, Fig. 3. This lock has rockable members 46 connected to a pressure responsive plunger 47 for being rocked thereby in response to the tank pressure to a position beneath the rim flange 48 in the filling pipe. A rubber sealing gasket 49 has flanges acting under the tank pressure to seal the engagement of the cap on the pipe.

For removing the fire hazard incidental to the pressure fuel system, the fuel tank pressure is relieved automatically by and upon the opening of the ignition switch. To this end, and according to the illustrated embodiment, the ignition switch embodies a valve 50, Fig. 6, with a passage 51 designed to connect a tank port 52 to an exhaust port 53, the port 52 being joined by a conduit 54 to the branch connection 40 while the exhaust port 53 discharges through a tube 55 into the air intake of the carburetor 2. A vent pipe 56 leading from the dome of the fuel tank to the filling pipe 44 will provide a bypass about any liquid standing in the latter and will thereby insure the release of all air pressure from the tank.

In operation, to start the engine the motorist will turn his ignition key 57 and proceed as usual in utilizing the self-starter to start the engine. Should the carburetor lack fuel, then the fuel responsive switch 42 will have assumed a circuit closing position in series with the ignition switch 43 and the solenoid valve 41 whereupon the pump circuit, including the wires 20', 20'', 20''', 20'''', and the ground 58, will be in a closed circuit relation with the battery 16 to energize the electric motor 20. The pump will instantaneously be brought into operation so as to supply the fuel tank 4 with the required pressure for lifting the fuel to the carburetor. Since the fuel system requires only a very small pressure, the pump will quickly bring the fuel system into operation by building up the required pressure in the tank whereupon the switch 42 will open the motor circuit, close the valve 41, and arrest further operation of the motor driven pump 19.

To bring the windshield cleaner into operation the control valve 10, remotely controlled through a flexible push-pull wire and knob 59, is opened so that the manifold suction will cause airflow through the flow controlled switch 22 and close the motor circuit 9', 9'' thereby to energize the pressure pump 19 for supplying superatmospheric pressure to the cleaner motor through the conduit 28 in accordance with the setting of the pressure regulating valve 38.

To operate the window regulator through either switch 11, the circuit with the battery will be through wire 20', 7', a relay 60, wires 7'' and 7''' through the solenoid valves 12 and to the ground 61. This circuit may be closed regardless of the position of the ignition switch and energizes the relay 60 to close a motor circuit through the armature 62 and wire 7a leading to the wire 9'' for energizing the pump. The actuation of either solenoid valve 12 opens the communication with the manifold 3 so that the pressure differential for actuating the accessory 7, like in the operation of the accessory 9, will be that between the negative and the positive pressures supplied.

Whenever the motorist parks his car and opens the ignition switch, the venting valve will serve to remove any objectionable pressure in the fuel tank so as to eliminate such fire hazard from the parked car.

The fuel feeding system just described is efficient and reliable in that it assures a prompt replenishment of the fuel feeding pressure immediately upon the closing of the ignition switch while removing the fire hazard automatically upon the opening of said switch. The fuel feeding pressure is relatively low, but is furnished almost instantaneously by the electrically driven pump which latter is capable of supplying a relatively greater pressure for accessory operation. The accessory-required pressure may be governed to the requirement of the individual accessories so that one accessory employing a light motor will not mitigate against the efficient performance of a heavier motor.

The foregoing description has been given in detail without thought of limitation since the inventive principles involved are capable of assuming other physical embodiments without departing from the spirit of the invention and the scope of the appended claims.

What is claimed is:

1. A motor vehicle having a power plant with a carburetor, an airtight fuel tank, a fuel line leading from the tank up to the carburetor; said tank having a filling pipe, a closure cap for the pipe, means responsive to the tank pressure for maintaining a given pressure head in the tank, and means responsive to the tank pressure for locking the closure cap in its operative position.

2. A motor vehicle having a power plant with a carburetor, an airtight fuel tank, a fuel line leading from the tank up to the carburetor; an ignition switch, said tank having a filling pipe, a closure cap for the pipe, means responsive to the tank pressure for maintaining a given pressure head in the tank, means responsive to the tank pressure for locking the closure cap in its operative position, and means under the control of the ignition switch for venting the tank to the atmosphere when the switch is opened.

3. A motor vehicle having a power plant with a carburetor, an airtight fuel tank, a fuel line leading from the tank up to the carburetor, an ignition switch for the power plant, means responsive to the tank pressure for maintaining a given pressure head when the ignition switch is closed, and means controlled by the switch for venting the tank when the switch is opened.

4. A motor vehicle having a power plant with a carburetor, an airtight fuel tank, a fuel line leading from the tank up to the carburetor, an ignition switch, a fluid actuated accessory for the vehicle, an electric pump connected in circuit with the switch to start the pump when the ignition switch is turned on for supplying both the tank and the accessory with operating pressure, valve means normally closing the tank to the pump, and means responsive to the tank pressure for opening the valve means when tank pressure replenishment is necessary.

5. A motor vehicle having a power plant with a carburetor, an airtight fuel tank, a fuel line leading from the tank up to the carburetor, a fluid actuated accessory for the vehicle, an electric pump for supplying both the tank and the accessory with operating pressure, valve means normally closing the tank to the pump, an ignition switch for the power plant connected in circuit with the valve means, and means responsive to the tank pressure for opening the valve means when tank pressure replenishment is necessary.

6. A motor vehicle having a power plant with a carburetor, an airtight fuel tank, a fuel line leading from the tank up to the carburetor, a fluid actuated accessory for the vehicle, an electric pump for supplying both the tank and the accessory with operating pressure, valve means normally closing the tank to the pump, an ignition switch for the power plant connected in circuit with the valve means, means responsive to the tank pressure for opening the valve means when tank pressure replenishment is necessary, and means operable upon the opening of the ignition switch for venting the tank.

7. A motor vehicle having a power plant with a carburetor, an airtight fuel tank, a fuel line leading from the tank up to the carburetor, a fluid actuated accessory for the vehicle, an electric pump for supplying both the tank and the accessory with operating pressure, valve means normally closing the tank to the pump, means responsive to the tank pressure for opening the valve means when tank pressure replenishment is necessary, a second fluid actuated accessory connected to the pump and requiring a different degree of pressure for its actuation, and means for providing such differential pressures in degree from the pump.

8. A motor vehicle having a power plant with an intake manifold, a carburetor, a fuel tank connected to the carburetor, a fluid actuated accessory connected to the manifold for actuation by the suction influence thereof, an electric pump operating to supply both the accessory and the fuel tank with positive pressure, and means responsive to the tank pressure for closing the tank to the pump while leaving the latter free to actuate the accessory solely or in cooperation with the manifold suction.

9. A motor vehicle having a power plant with the intake manifold, a carburetor, a fuel tank connected to the carburetor, a fluid actuated accessory connected to the manifold for actuation by the suction influence thereof, an electric pump operating to supply both the accessory and the fuel tank with positive pressure, means responsive to the tank pressure for closing the tank to the pump while leaving the latter free to actuate the accessory solely or in cooperation with the manifold suction, and means controlled by the power plant switch for venting the tank of its pressure.

10. A motor vehicle having a power plant with an intake manifold, a carburetor, a fuel tank connected to the carburetor, a fluid actuated accessory connected to the manifold for actuation by the suction influence thereof, an electric pump operating to supply both the accessory and the fuel tank with positive pressure, pressure lines connecting the pump to both the tank and the accessory, means for interrupting the pressure communication between the tank and the pump, means responsive to the tank pressure for rendering the interrupting means operative.

11. In a motor vehicle having an intake manifold, a carburetor, a fuel tank connected by a fuel line to the carburetor, plural fluid actuated accessories connected to the manifold, an electric pump acting as a source of positive pressure and connected by individual passages to the accessories and to the tank, means responsive to the tank pressure for closing the tank-connecting passage, and means in one accessory-connecting passage for limiting the accessory-supplied pressure to a degree less than that supplied the other accessory.

12. In a motor vehicle having an intake manifold, a carburetor, a fuel tank connected by a fuel line to the carburetor, plural fluid actuated accessories connected to the manifold, an electric pump acting as a source of positive pressure and connected by individual passages to the accessories and to the tank, means responsive to the tank pressure for closing the tank-connecting passage, means for venting the tank at will to the atmosphere, and means in one accessory-connecting passage for limiting the accessory-supplied pressure to a degree less than that supplied the other accessory.

13. In a motor vehicle having an intake manifold, a carburetor, a fuel tank connected by a fuel line to the carburetor, plural fluid actuated accessories connected to the manifold, an electric pump acting as a source of positive pressure and connected by individual passages to the accessories and to the tank, a valve for closing the tank-connecting passage to the pump, means responsive to the fuel line pressure for so closing the valve against excess tank pressure, means interposed in the tank connecting passage between the valve and the tank for venting the latter, and means accessible from within the vehicle for rendering the venting means operative.

14. In a motor vehicle having an intake manifold, a carburetor, a fuel tank connected by a fuel line to the carburetor, plural fluid actuated accessories connected to the manifold, an electric pump acting as a source of positive pressure and connected by individual passages to the accessories and to the tank, a valve for closing the tank-connecting passage to the pump, means responsive to the fuel line pressure for so closing the valve against excess tank pressure, means interposed in the tank connecting passage between the valve and the tank for venting the latter, an ignition switch for the vehicle, and means operable upon the opening of the switch to vent the tank.

15. In a motor vehicle having a power plant with an intake manifold, plural fluid actuated accessories connected to the manifold by individual passages for suction actuation thereof, a source of positive pressure likewise connected by individual passages to the accessories for pressure actuation thereof, and a pressure responsive switch interposed in one suction passage and operable to bring the source into functioning and provided with a valved controlled opening therethrough to enable suction actuation of the related accessory.

16. An accessory system for motor vehicles having a source of suction leading to a fluid actuated accessory, a normally inoperative source of positive pressure connected to the accessory for providing with the first source a pressure differential between the negative and positive pressures, and means controlled by the flow of air from the accessory to the source of suction for causing the operation of the source of positive pressure.

ANTON RAPPL.

REFERENCES CITED

The following references are of record in the file of this patent:

UNITED STATES PATENTS

| Number | Name | Date |
| --- | --- | --- |
| 1,424,486 | Kinzie | Aug. 1, 1922 |
| 1,912,203 | Hueber et al. | May 30, 1933 |
| 1,988,797 | Hueber | Jan. 22, 1935 |
| 2,095,833 | Rockwell | Oct. 12, 1937 |
| 2,239,566 | Mercier | Apr. 22, 1941 |
| 2,459,807 | Gavin et al. | Jan. 25, 1949 |